United States Patent [19]

Kormendy

[11] 4,286,771

[45] Sep. 1, 1981

[54] HAULAGE APPARATUS FOR MINING MACHINES

[75] Inventor: Miltiades Kormendy, Rolleston on Dove, England

[73] Assignee: Coal Industry (Patents) Limited, London, England

[21] Appl. No.: 940,284

[22] Filed: Sep. 7, 1978

[30] Foreign Application Priority Data

Sep. 13, 1977 [GB] United Kingdom ............... 38071/77

[51] Int. Cl.³ .............................................. B66F 1/08
[52] U.S. Cl. .................................................. 254/108
[58] Field of Search .......................... 254/105, 108–111

[56] References Cited

U.S. PATENT DOCUMENTS 3,860,215  1/1975  Chambers ............................. 254/110
3,994,475  11/1976  Chambers ............................. 254/108

Primary Examiner—Robert C. Watson
Attorney, Agent, or Firm—Stevens, Davis, Miller & Mosher

[57] ABSTRACT

The two propulsion rams are simultaneously actuated in an opposite sense with respect to each other by control means comprising a directional control valve which controls the supply of pressure fluid to the hydraulically actuated track-engaging means and which is actuated in accordance with the operation of means detecting when at least one of the propulsion rams is approaching the end of at least one stroke. The control means also comprises a further directional control valve which controls the supply of pressure fluid to the propulsion rams and which is actuated in accordance with the supply of pressure fluid from the first mentioned direction control valve.

11 Claims, 3 Drawing Figures

HAULAGE APPARATUS FOR MINING MACHINES

This invention relates to haulage apparatus for mining machines and is an improvement in the haulage apparatus described and claimed in our prior British patent specification No. 1,291,427.

In British patent specification No. 1,291,427 there is claimed haulage apparatus for a mining machine comprising two hydraulically actuated rams each of which is attachable at one end to the machine and each of which is attached at its other end to separate track-engaging means for releasably engaging a track extending along the path of the machine, and control means for simultaneously actuating the two rams in an opposite sense with respect to each other, the control means comprising limit switch means sensitive to the extension of the piston rods of the rams.

An object of the present invention is to provide improved haulage apparatus for a mining machine.

According to the invention haulage apparatus for a mining machine comprises two hydraulically actuated piston and cylinder arrangements each of which is attachable at one end to the machine and each of which is attached at its other end to separate hydraulically actuated track-engaging means for releasably engaging a track extending along the path of the machine, and control means for simultaneously actuating the two piston and cylinder arrangements in an opposite sense with respect to each other, the control means comprising a directional control valve which in use controls the supply of pressure fluid to the hydraulically actuated track-engaging means and which is actuated in accordance with the operation of means detecting when at least one of the piston and cylinder arrangements is approaching the end of at least one stroke, and a further directional control valve which in use controls the supply of pressure fluid to the piston and cylinder arrangements and which is actuated in accordance with the supply of pressure fluid from the first mentioned directional control valve.

Preferably, the means comprises limit-switch means provided adjacent one end of each of the piston and cylinder arrangements.

Advantageously, said first mentioned directional control valve is pilot operated and the limit-switch means includes a directional control valve for controlling supply of pilot pressure to control actuation of the first mentioned directional control valve.

Preferably, said further directional control valve is pilot operated, in use the pilot mechanisms of the valve being arranged to sense the supply of pressure fluid from said first mentioned directional control valve.

Conveniently, manually actuated directional control valve means are provided intermediate the first mentioned directional control valve and the track engaging means for controlling the operation of the track-engaging means.

Alternatively, manually actuated directional control valve means are provided intermediate the first mentioned control valve and said means for detecting when at least one of the piston and cylinder arrangements is approaching the end of at least one stroke.

Preferably, a portion of the alternative manually actuated directional control valve means is provided intermediate said further directional control valve means and the piston and cylinder arrangements.

Conveniently, the alternative manually actuated directional control valve means comprises a valve assembly including two valves having common handle means for manual operation.

Conveniently, the track-engaging means and the piston and cylinder arrangements are supplied from separate pump means.

Alternatively, the track engaging means and the piston and cylinder arrangements are supplied from common pump means.

Preferably, each track-engaging means includes hydraulic ram means which in use clamp the track constituted by a stationary rail.

Alternatively, each track-engaging means includes hydraulic ram means which in use urges an abutment into or out of drivable engagement with abutment portions on the track.

Advantageously, sensor means are provided to ensure that, in use, one of the track-engaging means is in drivable engagement with the track before the other of the track-engaging means can release the rail.

By way of example only, three embodiments of the present invention will be described with reference to the accompanying drawings in which.

Figure 1:
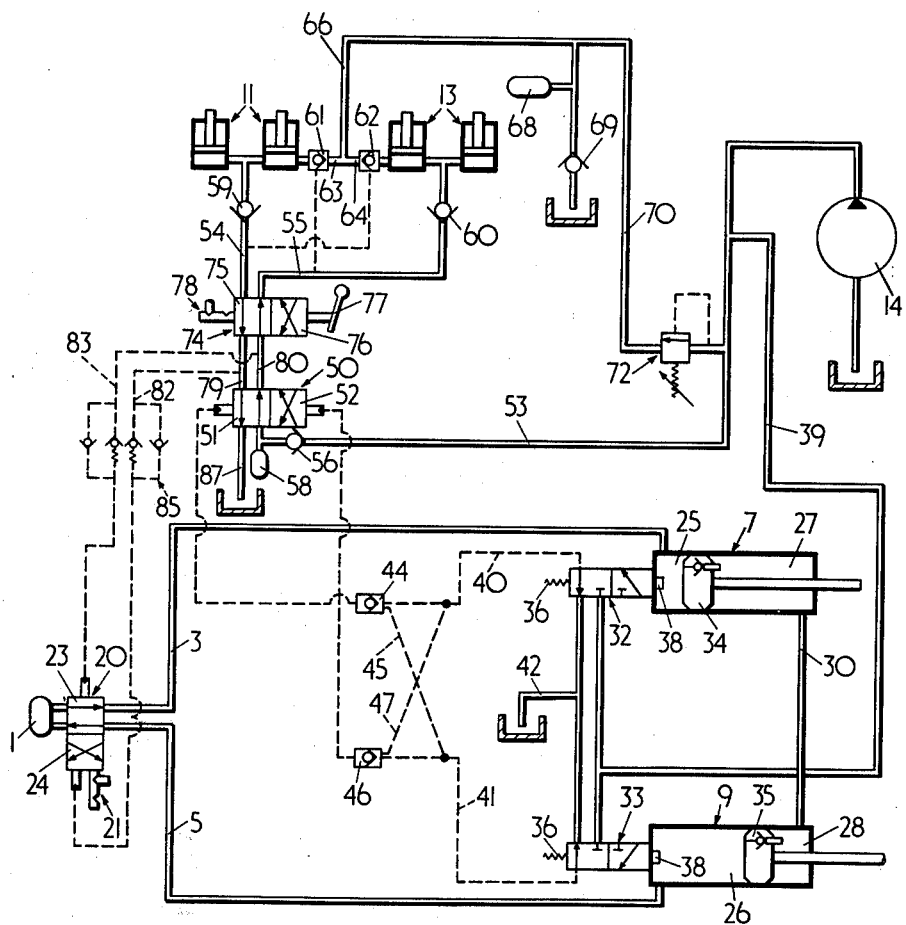
FIG. 1 shows part of a hydraulic circuit diagram of a mining machine including haulage apparatus which is constructed in accordance with a first embodiment of the present invention.

In FIG. 1 the first embodiment of haulage apparatus comprises a first pump 1 for supplying pressure fluid via lines 3 and 5 to two double acting hydraulically actuated piston and cylinder arrangements 7 and 9 for alternatively advancing the mining machine (not shown) along its path. Each of the piston and cylinder arrangements is attachable at one end to the mining machine and each of which is provided with track-engaging means comprising pairs of rams 11, 11 and 13, 13 for gripping a stationary rail (not shown). The pairs of rams 11, 11 and 13, 13 are mounted on the free ends of the piston and cylinder arrangements 9 and 7, respectively. The rams in each pair are arranged to engage one side of the rail to clamp the stationary rail between the rams and an opposed jaw provided by the track-engaging means and, thereby, provide an anchorage for the associated advancing piston and cylinder arrangement. When the rams of the track-engaging means are not clamping the rail the means is free to slide along the rail under the action of the associated piston and cylinder arrangement. The pairs of rams 11, 11 and 13, 13 are supplied with pressure fluid from a second pump 14. Operation of the piston and cylinder arrangements 7 and 9 and of the pairs of rams 11, 11 and 13, 13 will be described later in this specification.

Pressure fluid supplied from pump 1 is controlled by a pilot operated change-over valve 20 including detent means 21 tending to retain the valve 20 in either of its two operational modes 23 or 24. The valve 20 controls the supply of pressure fluid passing along lines 3 and 5 to cylinder sections 25 and 26 of the two piston and cylinder arrangements 7 and 9, respectively. The other cylinder sections 27 and 28 are interconnected by a line 30.

Limit-switch means 32 and 33 for controlling pilot pressure along lines 39, 40, 41 and 42 from pump 14 are located within the cylinder sections 25 and 26 to sense when pistons 34 and 35 approach the end of their inward strokes, respectively. Each of the limit-switch means is urged into the operational mode as shown in the drawing by a spring 36 and is moved against its spring loading into its alternative operational mode by the associated piston 34 or 35 contacting a push button 38.

The pilot lines 40 and 41 are provided with a pilot operated check valve arrangement 44, 45, 46 and 47 and feed pilot pressure to actuate a pilot operated change over valve 50 which has two operational modes 51 and 52 and which controls fluid pressure along lines 53, 54 and 55 from pump 14 to the pairs of rams 11, 11 and 13, 13 of the track-engaging means. The line 53 is provided with a non-return valve 56 and an accumulator 58 for ensuring sufficient pressure fluid is available to ensure a rapid operation of the pairs of rams 11, 11 or 13, 13 when the valve 50 is actuated. Non-return valves 59 and 60 are provided in lines 54 and 55, respectively. In addition pilot operated non-return valves 61 and 62 are provided in the return lines 63 and 64 from the pairs of rams 11, 11 and 13, 13, respectively, to ensure that one pair of rams is supplied with sufficient fluid pressure to ensure the rail is clamped. Thus, at any one time the rail must be clamped by one of the track-engaging means. The return lines 63 and 64 are connected to a common return line 66 which is provided with an accumulator 68 maintained above a preselected relatively low pressure by a pressure limiting valve 69. The action of the accumulator 68 is to prevent repeated on-off operation of the pairs of rams 11, 11 and 13, 13 due to pressure fluctuation. The line 66 is provided with a return branch 70 for relieving supply pressure in line 53 via an adjustable pilot operated spring loaded relief valve 72 which prevents the rams 11, 11 and 13, 13 from exhausting completely.

The supply of pressure fluid from valve 50 along lines 54 and 55 is controlled by a manually actuated direction control valve 74 having two operational modes 75 and 76, a handle 77 and detent means 78 tending to retain the valve 74 in its current operational mode 75 or 76.

Fluid pressure in portions 79 and 80 of the lines 54 and 55 lying between the two valves 50 and 74 is sensed by pilot lines 82 and 83 connected to opposite ends of the previously mentioned pilot operated changeover valve 20 to control operation of the valve 20 in accordance with the fluid pressures sensed in lines 79 and 80. The action of the pilot pressure overrides the action of the detent means 21. A check valve arrangement 85 including two spring loaded check valves is provided in pilot lines 82 and 83 to ensure that the pressure in the current feed line 82 or 83 and thereby the clamping action of the associated rams 11, 11 or 13, 13 has reached a desired level before the associated spring loaded check valve opens to feed pressure fluid to the associated pilot of valve 20 to reverse the action of the rams 7 and 9. The two non-spring loaded check valves in the arrangement 85 to ensure that when the action of the lines 82 and 83 is reversed fluid is freely exhausted from the previously pressurised pilot of valve 20.

A return line 87 is provided from the valve 50 to drain pilot fluid to tank.

In operation with pumps 1 and 14 driven by an electric motor (not shown) pressure fluid is fed along line 3 via valve 20 which as shown in the drawing is in operational mode 23 to the cylinder section 25 of the piston and cylinder arrangement 7 to urge the piston 34 in a direction away from the limit switch means 32. Pressure fluid urged out of cylinder section 27 by movement of the piston 34 and along line 30 into cylinder section 28 of the piston and cylinder arrangement 9 urges the piston 35 towards the limit switch means 33. While pressure fluid from pump 1 is moving the pistons 34 and 35 in the above described manner pressure fluid from pump 14 is fed along lines 53, 80 and 55 via valves 50 and 74 to actuate the pair of rams 13, 13 which thereby clamp the rail to provide an anchorage for the piston rod of the piston and cylinder arrangement 7. Thus, as pressure fluid from pump 1 urges the piston 34 to extend the piston and cylinder arrangement 7 the machine which is attached to the cylinder part is urged along its path. Simultaneously, the track-engaging means associated with the pair of released rams 11, 11 is advanced along the rail under the action of the piston and cylinder arrangement 9.

Upon the piston 35 of the piston and cylinder arrangement contacting and depressing the push button 38 the limit switch means 33 is urged against the action of its spring bias into its other operational mode feeding fluid pressure from pump 14 via lines 39 and 41 to actuate the associated pilot of valve 50. Valve 44 in line 40 is opened by fluid pressure in line 41 which is sensed via line 45 to exhaust fluid pressure from the opposite pilot of valve 50 permitting the valve 50 to move into its operational mode 52 to feed pressure fluid along line 54 to actuate the pair of rams 11, 11 which thereby clamp the rail to provide an anchorage for the piston and cylinder arrangement 7 when sufficient fluid pressure in line 54 is sensed by valve 62 via its pilot line the valve 62 opens to exhaust pressure fluid via line 66 to release the pair of rams 13, 13 thereby permitting the associated track-engaging means to be slid along the rail under the action of the piston and cylinder arrangement 7 as now described.

When the operational mode of this valve 50 is changed to mode 52 as described above the increase of fluid pressure in line 79 is sensed via line 82 by the associated pilot of valve 20. Simultaneously, line 83 is connected to tank via line 87 to permit the pilot pressure in line 82 to urge the valve 20 into its operational mode 24. The valve 20 is then retained in this mode 24 by the action of the detent means 21. In operational mode 24 pressure fluid is fed from pump 1 along line 5 into the cylinder section 26 of the piston and cylinder arrangement 9 to urge the piston 35 in a direction away from the limit switch means 33. Such relative movement of the anchored piston 35 and the cylinder section 26 which is attached to the mining machine urges the machine along its path. In addition, such relative movement urges pressure fluid from cylinder section 28 along line 30 into cylinder section 27 of the piston and cylinder arrangement 7. Hence, the piston 34 of the piston and cylinder arrangement 7 is urged in a direction towards the limit switch means 32. Fluid pressure previously existing in cylinder section 25 is fed to tank via line 3 and valve 20.

Thus the machine is advanced by action of the piston and cylinder arrangement 9 and the released track-engaging means is advanced along the rail by the action of the piston and cylinder arrangement 7. By the time the machine has advanced the full stroke of the piston and cylinder arrangement 9 the piston 34 of the piston and cylinder arrangement 7 abuts and depresses the push button 38 of the limit switch means 32 to reverse the operational mode of the limit switch means 32 and thereby of the valve 50 and the pairs of rams 11, 11 and 13, 13 in a manner similar to that previously described. Also, the operational mode of the valve 20 is changed to reverse the action of the piston and cylinder arrangements 7 and 9. Thus, the machine is moved substantially continuously along its path by repeated automatic reverse operation of the associated valves and piston and cylinder arrangements as described above.

If at any stage during the machine's travel an operator should wish to override the automatic operation of the haulage apparatus to reverse the direction of machine travel he has merely to change the operational mode of the valve 74 by actuation of handle 77. This will reverse the operation of the track-engaging means causing the effect of the piston and cylinder arrangements to be changed. Thus, if prior to operating the valve 74 the machine was being advanced under the action of the piston and cylinder arrangement 7 then after operation of the valve the machine will be advanced in the opposite direction under the action of the piston and cylinder arrangement 9.

In modified embodiments of the haulage apparatus the pumps 1 and 14 are replaced by common pump means.

Figure 2:
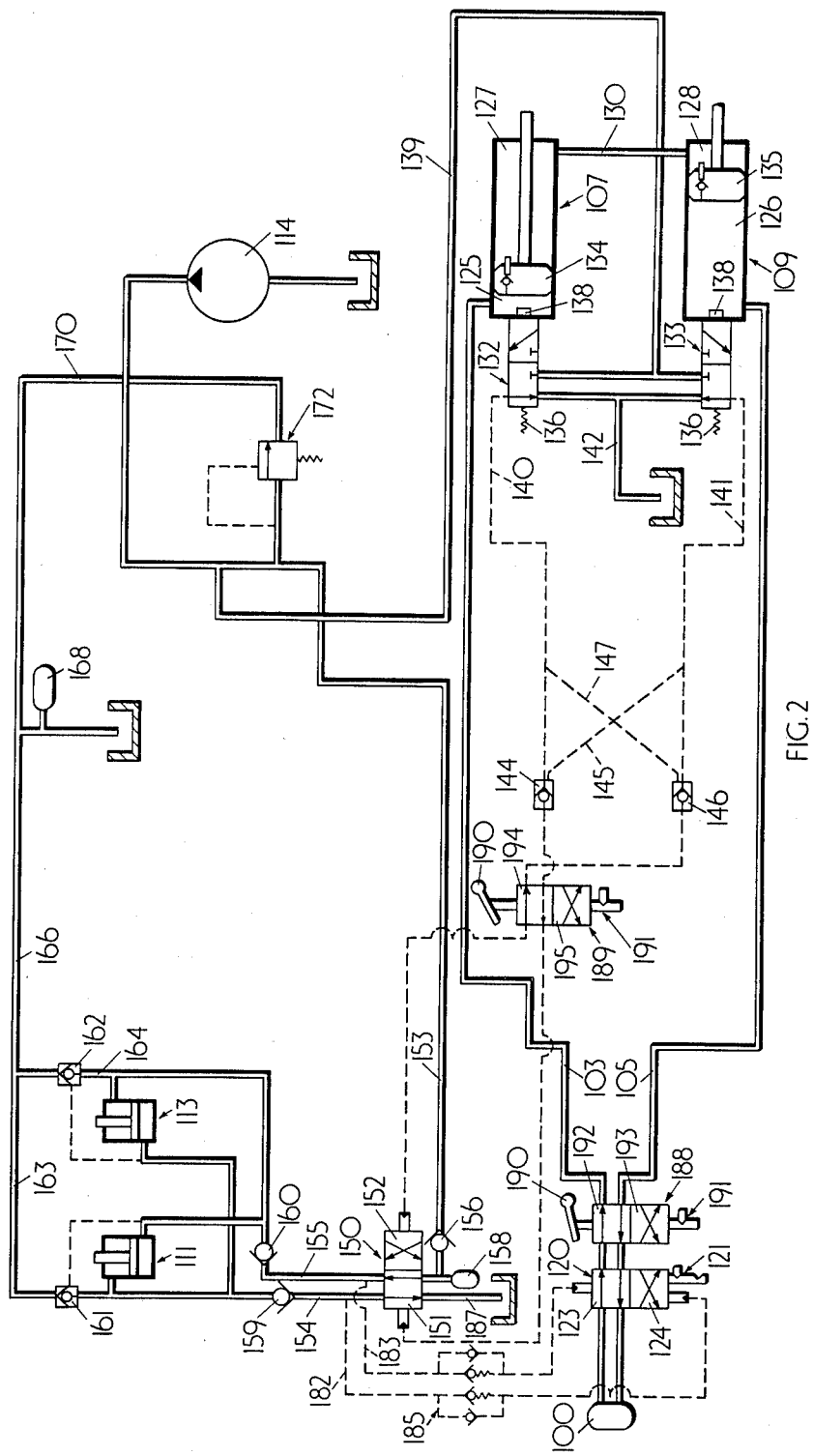
FIG. 2 shows part of a hydraulic circuit diagram of a mining machine including haulage means constructed in accordance with a second embodiment of the present invention.

FIG. 2 of the drawings shows a second embodiment of haulage apparatus constructed in accordance with the present invention. In a somewhat similar manner to the first described embodiment pressure fluid is supplied along lines 103 and 105 from a first pump 100 to actuate two hydraulic piston and cylinder arrangements 107 and 109 which are thereby simultaneously driven in an opposed sense and advance the mining machine (not shown) along its path. Also, pressure fluid is supplied from a second pump 114 to alternatively actuate rams 111 and 113 of two track-engaging means which alternatively provide anchorage for the advancing piston and cylinder arrangements 107 and 109. The track-engaging means including rams 111 and 113 are mounted on the piston rods of the piston and cylinder arrangements 107 and 109, respectively, the track-engaging means used with this second embodiment of haulage apparatus being, for example, as described and claimed in the co-pending assignee's U.S. patent application Ser. No. 883,105 filed Mar. 3, 1978. In this prior application the track-engaging means comprises a pivotally mounted abutment and a double acting locking ram operable independently of the associated advancing piston and cylinder arrangement 107 or 109, the locking ram is operable to move the abutment into and out of drivable engagement with abutment portions of the track. The abutment portions of the track may comprise pegs, in which case the abutment may be constituted by a hole. Alternatively, the abutment portions are holes in the track and the abutment is a peg which is brought into and out of drivable engagement with the holes by the action of the locking ram. In FIG. 2 of the present specification the locking ram is represented by the double acting hydraulic ram 111 and 113. The abutment portions are arranged at a fixed spacing coincident with the normal stroke of the piston and cylinder arrangements 107 and 109.

The supply of pressure fluid along lines 103 and 105 is controlled by a pilot operated changeover valve 120 including detent means 121 tending to retain the valve 120 in either of its two operational modes 123 or 124. The valve 120 controls the supply of pressure fluid passing along lines 103 and 105 to cylinder portions 125 and 126 of the two double acting hydraulic piston and cylinder arrangements 107 and 109, respectively. The other cylinder portions 127 and 128 are interconnected along line 130.

As with the first described embodiment limit-switch means 132 and 133 for controlling pilot pressure along lines 139, 140, 141 and 142 from pump 114 are located within cylinder sections 125 and 126, to sense when pistons 134 and 135 approach the end of their inward strokes, respectively. Each of the limit-switch means is urged into the operational mode as shown in the drawing by a spring 136 and is moved against its spring loading into its alternative operational mode by the associated piston 134 or 135 contacting a push button 138.

Pilot lines 140 and 141 are provided with a pressure sensitive stop valve arrangement 144, 145, 146 and 147 and feed pilot pressure to actuate a pilot operated changeover valve 150 which has two operational modes 151 and 152 and which controls fluid pressure along lines 153 and branched lines 154 and 155 from pump 144 to the double acting rams 111 and 113 of the track-engaging means. The line 153 is provided with a non-return valve 156 and an accumulator 158 for ensuring sufficient pressure fluid is available to ensure a rapid operation of the rams 111 and 113 when the valve 150 is actuated. Non-return valves 159 and 160 are provided in branched lines 154 and 155, respectively. These latter lines supply pressure fluid to opposed sides of the two double acting rams 111 and 113. In addition, pilot operated non-return valve 161 and 162 are provided in return lines 163 and 164 from the rams 111 and 113, respectively, to ensure that one ram 111 or 113 cannot be released until the other ram 113 or 111 is supplied with sufficient fluid pressure to ensure the associated track-engaging means drivably engages the track. Thus, at any one time the track must be engaged by one of the track-engaging means. The return lines 163 and 164 are connected to a common return line 166 which is provided with an accumulator 168 maintain at above a preselected relatively low pressure by a pressure limiting valve (not shown in FIG. 2). The action of the accumulator 168 is to prevent repeated on-off operation of the rams 111 and 113 due to pressure fluctuation. The line 166 is provided with a return branch line 170 for relieving supply pressure in line 153 via an adjustable pilot operated, spring loaded relief valve 172.

Fluid pressure in lines 154 and 155 is sensed by pilot lines 182 and 183 connected to opposite ends of the previously mentioned pilot operated changeover valve 120 to control operation of the valve 120 in accordance with the fluid pressures sensed in lines 154 and 155. The action of the pilot pressure overrides the action of the detent means 121. A stop valve arrangement 185 including two resiliently biassed valves is provided in pilot lines 182 and 183 to ensure the anchoring action of the rams 111 or 113 has reached a desired level before pilot pressure is fed to valve 120 to reverse the operational mode of the valve and thereby reverse the operation of the advancing rams 107 and 109. The two non spring loaded check valves in the arrangement 185 ensure pilot pressure is freely exhausted from the valve 120 when the valve changes its operational mode.

A return line 187 is provided from valve 150 to drain pilot fluid to tank.

The hydraulic circuit shown in FIG. 2 includes a valve assembly comprising two manually actuated directional control valves 188 and 189 which have a common handle 190 ensuring both these valves are actuated simultaneously. The valves 188 and 189 also have common detent means 191 tending to retain the valves in either of their operational modes 192 and 193, and 194 and 195, respectively. Directional control valve 188 is located intermediate the valve 120 and the piston and cylinder arrangements 107 and 109 and reverses the effect of valve 120 switching the supply of pressure fluid from piston and cylinder arrangement 107 to 109 or vice versa depending upon the current settings of the valves 120 and 188.

The valve 189 controls the supply of pilot pressure for the pilot operated valve 150 in the lines 140 and 141 and ensures that when the valve assembly 188, 189 is actuated into its different operating modes the actuation of the two track-engaging means is changed to suit the change of the direction of travel of the machine. Upon the manual operation of the valve assembly 188, 189 the supply of pressure fluid is switched from line 103 to line 105 or vice versa. Thus the direction of travel of the pistons 134 and 135 within their associated cylinders is reversed. Although actuation of valve 189 appears to reverse the connections to valve 150 it will be appreciated that because of the action of the non-return valves 144 and 146 no switching of the pilot pressure feed to valve 150 occurs. The non-return valves maintain pilot pressure on the same end of the valve 150 as previously before the operation of the valve assembly 188, 189. Then even though the action of the piston and cylinder arrangements 107 and 109 is reversed the action of the track engaging means remains the same. Therefore when the piston and cylinder arrangement 107 or 109 associated with the still anchored track-engaging means changes its direction of travel so the machine changes its direction of travel along its path. Unlike the first described embodiment in which the track-engaging means were able to clamp onto any portion of the rail the track-engaging means of the present described embodiment can only drivably engage the track at fixed locations associated with the track abutment portions. Thus, upon the piston and cylinder arrangements 107 and 109 changing direction due to actuation of the valve assembly 188, 189 it is essential that the operational mode of the two track-engaging means remains as before actuation of the valve assembly, i.e. the track-engaging means which previously was in drivable engagement with the track must remain in drivable engagement and vice versa. However, once the piston 134 or 135 approaches the end of its inward stroke and contacts the associated limit switch means 132 or 133 the automatic operation of the haulage apparatus is as previously described with reference to FIG. 1.

Figure 3:
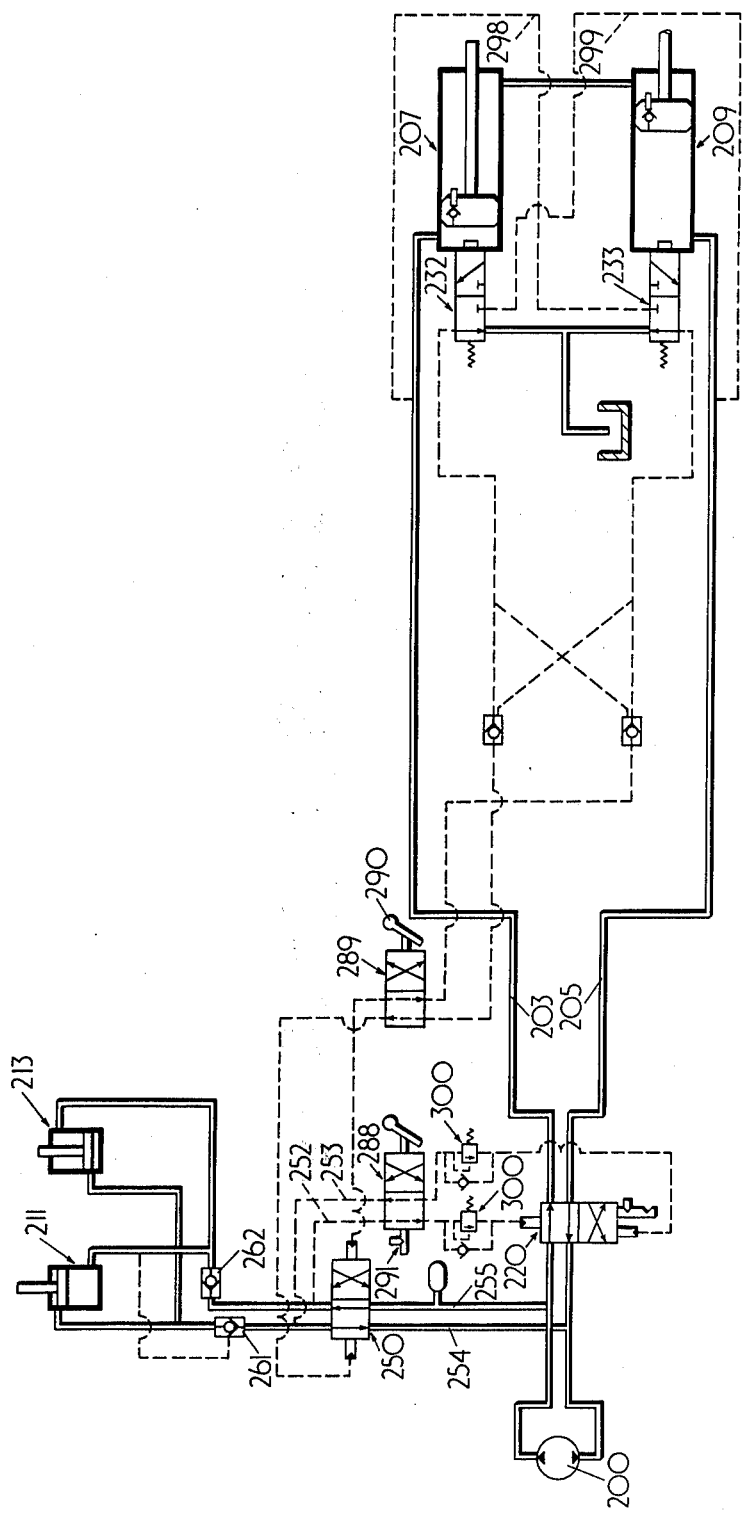
FIG. 3 shows part of a hydraulic circuit diagram of a mining machine including haulage apparatus constructed in accordance with a third embodiment of the present invention.

FIG. 3 shows a portion of a hydraulic circuit for a mining machine including haulage apparatus in accordance with a third embodiment of the present invention. The arrangement is somewhat similar to the second embodiment described above with reference to FIG. 2 except that the two pumps 100 and 114 of the second embodiment are replaced by a common relatively high capacity pump 200 which supplies pressure fluid via lines 203 and 205 to two hydraulically actuated piston and cylinder arrangements 207 and 209 which advance the machine in similar manner to the piston and cylinder arrangements 107 and 109 of the second embodiment. The pump 200 also supplies pressure fluid via branched lines 254 and 255 to double acting hydraulic rams 211 and 213 which are included in track-engaging means similar to those described with reference to the second embodiment and comprising an abutment movable into or out of drivable engagement with a series of abutment portions provided along the track.

The third embodiment comprises valves 220, 250 and 289 which are similar to valves 120, 150 and 189 of the second embodiment and which perform similar functions to those previously described valves. The third embodiment also includes limit switch means 232 and 233 and associated hydraulic circuit similar to the second embodiment.

Pilot operated non-return valves 261 and 262 are provided to control the exhaust of pressure fluid from the rams 211 and 213 via the branched lines 254 and 255 which in this embodiment alternatively define feed and exhaust lines for the rams 211 and 213.

The third embodiment includes a manually controlled valve 288 which has common control handle means 290 with the previously mentioned valve 289 and which together with valve 289 constitute a valve assembly. The valves 288 and 289 have common detent means 291 tending to retain the valve assembly 288, 289 in either of its operational modes.

The valve 288 is provided in lines 252 and 253 which sense the pressure of fluid in lines 254 and 255, respectively, and actuate the pilot operated changeover valve 220 in accordance with the sensed fluid pressure in lines 254 and 255. Manual actuation of the valve assembly 288, 289 causes the valve 288 to reverse the action of pilot pressure acting on valve 220 which thereby reverses its operational mode to change the direction of travel of the pistons within the cylinders of the piston and cylinder arrangements 207 and 209 to reverse the direction of travel of the machine along its path. Valve 289 retains the two track-engaging means in the operational mode existing before manual actuation of the valve assembly 288, 289 in similar manner to that previously described with reference to the second described embodiment. Lines 298 and 299 are provided to supply pilot pressure to the limit switch means 232 and 233. Spring biassed valve arrangements 300 ensure the pressure in lines 252 or 253 and the anchoring action of the ram 211 or 213 has reached a desired level before pilot pressure is fed to the valve 220 to reverse the operational mode of the valve and thereby reverse the operation of the advancing rams 207 and 209. The two non spring loaded check valves in arrangements 300 ensure pilot pressure can be exhausted freely from the valve 220 when its operational mode is reversed. The arrangements 300 ensure that one of the track engaging means is fixedly anchored before the action of the advancing rams is reversed.

The remaining operation of the third embodiment is as previously described with reference to FIG. 2.

From the above description it will be appreciated that the present invention provides haulage apparatus for a mining machine which enables substantial constant movement of the machine along its path to be achieved. Also the haulage apparatus ensures that one of the track-engaging means is in drivable engagement with the track.

I claim:

1. A mining machine comprising a body movable along a track extending along a desired machine path, two hydraulically actuated piston and cylinder arrangements each of which is attachable at one end to the machine body and each of which has at its other end means for attaching to hydraulically actuated track-engaging means for releasably engaging the track under action of a hydraulic ram, and control means for simultaneously actuating the two piston and cylinder arrangements in an opposite sense with respect to each other, the control means comprising detector means for detecting when at least one of the piston and cylinder arrangements is approaching the end of one stroke and having operational modes indicative of the detected condition of said at least one of the piston and cylinder arrangements, a directional control valve which in use has different operational modes for controlling the supply of pressure fluid to the hydraulic rams of the track-engaging means and which is actuated between its operational modes in accordance with the operational mode of said detector means, and a further directional control valve which in use has different operational modes for controlling the supply of pressure fluid to the piston and cylinder arrangements and which is actuated between its operational modes in accordance with the operational modes of the first mentioned directional control valve.

2. A mining machine as claimed in claim 1, wherein the detector means comprises limit-switch means provided adjacent one end of each of the piston and cylinder arrangements.

3. A mining machine as claimed in claim 2, wherein said first mentioned directional control valve is pilot operated and the limit-switch means includes a directional control valve for controlling supply of pilot pressure to control actuation of the first mentioned directional control valve.

4. A mining machine as claimed in claim 3, wherein said further directional control valve is pilot operated, in use the pilot mechanisms of the valve being arranged to sense the supply of pressure fluid from said first mentioned directional control valve.

5. A mining machine as claimed in claim 1, wherein manually actuated directional control valve means are provided intermediate the first mentioned directional control valve and the hydraulic rams of the track engaging means for controlling the operation of said hydraulic rams.

6. A mining machine as claimed in claim 1, wherein manually actuated directional control valve means are provided intermediate the first mentioned control valve and said means for detecting when at least one of the piston and cylinder arrangements is approaching the end of at least one stroke.

7. A mining machine as claimed in claim 6, wherein a portion of the manually actuated directional control valve means is provided intermediate said further directional control valve means and the piston and cylinder arrangements.

8. A mining machine as claimed in claim 7, wherein the manually actuated directional control valve means comprises a valve assembly including two valves having common handle means for manual operation.

9. A mining machine as claimed in claim 1, wherein the track-engaging means and the piston and cylinder arrangements are supplied from separate pump means.

10. A mining machine as claimed in claim 1, wherein the track-engaging means and the piston and cylinder arrangements are supplied from common pump means.

11. A mining machine as claimed in claim 1, wherein sensor means are provided to ensure that, in use, one of the hydraulic rams of one of the track-engaging means is in its track engaged mode before the hydraulic ram of the other of the track-engaging means can be released from its track engaged mode.

* * * * *